United States Patent [19]

Peters

[11] 4,401,892
[45] Aug. 30, 1983

[54] LABEL READER AND SYSTEM

[76] Inventor: C. Martin Peters, 1037 Nottingham, Grosse Pointe Park, Mich. 48230

[21] Appl. No.: 473,979

[22] Filed: Mar. 11, 1983

Related U.S. Application Data

[63] Continuation of Ser. No. 272,746, Jun. 11, 1981, abandoned.

[51] Int. Cl.³ .................................................. G06K 7/10
[52] U.S. Cl. ..................................... 250/566; 235/480
[58] Field of Search .......................... 250/566, 568, 569; 235/480, 475, 458, 459, 460, 461

[56] References Cited

U.S. PATENT DOCUMENTS

4,135,663 1/1979 Nojiri et al. ..................... 250/569 X

Primary Examiner—David C. Nelms
Assistant Examiner—Darwin R. Hostetter
Attorney, Agent, or Firm—Barnes, Kisselle, Raisch, Choate, Whittemore & Hulbert

[57] ABSTRACT

Photo-optical apparatus for reading a label or the like carrying a label code readable in the form of a binary code characterized by presence or absence of optically detectable indicia at predefined zones of predetermined dimension. The apparatus includes optical sensors disposed adjacent to a path so as to be responsive to indicia carried by the label travelling in a direction such that the indicia is disposed in first and second tracks parallel to the direction of label travel. A programmed microprocessor is responsive to the state of the sensor outputs for detecting the direction of label travel and reversals of the direction of travel, and for selectively controlling entry and output of the label code to and from a data storage register such that upon completion of a read cycle the order of data significance can be determined independently of direction of travel of the label through the path past the sensors and independently of the left or right side mounting of sensors with respect to label travel path.

12 Claims, 9 Drawing Figures

LABEL READER AND SYSTEM

This is a continuation of application Ser. No. 272,746 filed June 11, 1981, now abandoned.

This invention relates to systems for reading labels and the like, and more particularly to a reader and system for identifying as it passes the reader, each specific label having at preselected locations indicia thereon readable in the form of binary signals.

BACKGROUND OF THE INVENTION

In many manufacturing, warehousing, material handling and other industrial applications it is necessary to identify pallets, workpieces, products, packages or other items as they pass one or more specific locations. Several systems utilizing photoelectric, magnetic or switch sensors and labels having reflective, magnetic or tripping indicia thereon have been previously developed. The accuracy and reliability with which these prior systems read and identify labels is usually dependent on label position, speed, direction of travel and reversal of direction of travel past the sensors, and usually requires that the sensors be mounted on a specific side of the path of travel of the labels.

BRIEF SUMMARY OF THE INVENTION

In accordance with this invention a preferred reader system includes a plurality of labels each having indicia thereon, an array of sensors responsive to the indicia of a label passing the sensors, and electronic circuitry responsive to signals from the sensors to produce a signal code identifying the specific label which has moved past the sensors. Each label preferably contains at least one first track having a series of indicia identifying the specific label and one or more indicia at each end of this series which identify the order of significance of the data of this series. Preferably, this series also includes one or more parity indicia. Each label also has at least one parallel second track having a series of indicia which identify movement of the label and preferably are identical to the second track of indicia of all the other labels used in the system.

Preferably the array of sensors has one photoelectric sensor responsive to the indicia of the first track of each label and two photoelectric sensors preferably 90° out of phase which are responsive to the indicia of the second track of each sensor.

Preferably the electronic circuitry is embodied in a programmed micro processor having logic circuitry controlling entry into a storage register of data generated in response to reading the indicia in the first track of a specific label to produce a code identifying such label. In response to signals produced by the sensors associated with the indicia of the second track of such label the logic circuitry controls entry into the storage register of the code identifying the label.

Objects, features and advantages of this invention are to provide a label reader and system which is readily adaptable to a large variety of industrial applications in many different environments and with items of varying size and configuration, which reads labels regardless of which side of the path of travel of the labels the sensors are mounted on, regardless of variations in label speed, direction of travel, interruption of travel and reversal in direction of travel, and does not read a label which does not pass from one end to the other completely by the sensors.

This invention and these and other objects, features and advantages thereof, will be best understood from the following description, the appended claims and the accompanying drawings in which:

DETAILED DESCRIPTION OF THE PREFERRED EMBODIMENTS

Figure 1:
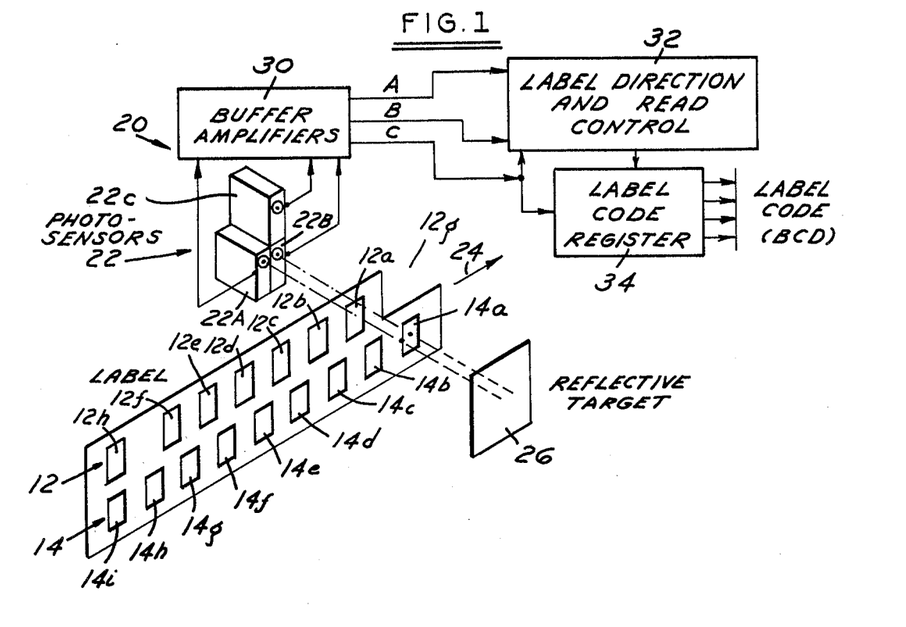
FIG. 1 is a partially schematic and partially functional block diagram of a presently preferred embodiment of the invention.

Referring in more detail to the drawings, FIG. 1 illustrates a presently preferred embodiment of the invention having a plurality of labels exemplified by label 10 with tracks 12 and 14 of indicia thereon and a reader apparatus 20. Label 10 moves along a path of travel between an array of photo-sensors 22 and a reflective target 26. The sensors 22 are connected to buffer amplifiers 30 which feed digital signals to label direction and read control logic circuitry 32 which controls the data put into a label code register 34.

In an application of the invention, labels 10 may be attached to pallets or the like carrying inventory, parts or work-in-process or other items in an industrial manufacturing environment which are moved by a conveyor or transfer past the mechanicam array of sensors 22 of the reader. The reader in accordance with the invention may be coupled to suitable item tracking and control apparatus (not shown) such as a programmed digital computer.

However, the reader in accordance with this invention in its broadest aspects is limited neither to such an application or environment nor to labels having the specific outline and indicia configuration illustrated in the drawings.

Thus, the term "label" in the following description and claims is to be construed in the broad sense to encompass any article on which indicia is stored in a manner and configuration so as to be readable in the manner described.

Figure 2:
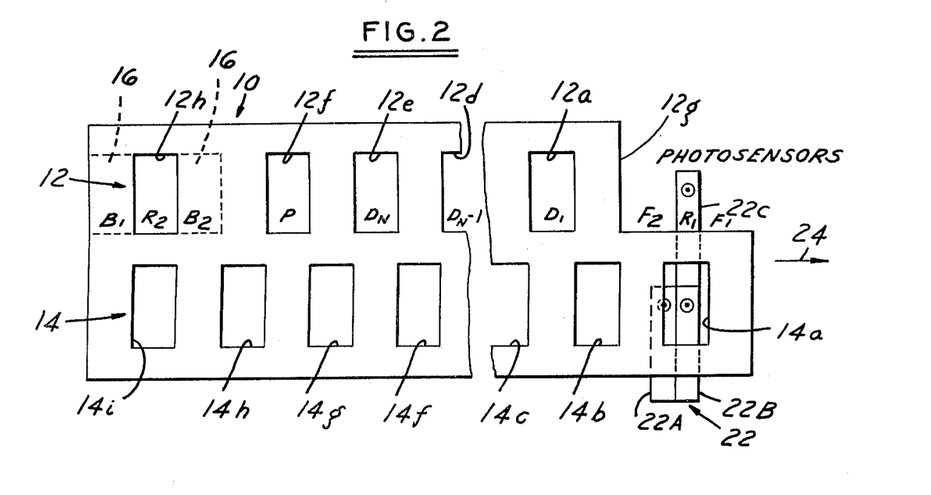
FIG. 2 is an elevational view of a portion of the apparatus illustrated in FIG. 1.

As shown in FIGS. 1 and 2, label 10 is an elongated plate or sheet of optically non-reflective material having a plurality of openings disposed therein at predefined zones or positions in two parallel tracks 12 and 14. Track 12 contains a label code unique to and identifying only the specific label 10 which is readable as binary coded data as a function of presence or absence of openings at a plurality of identical and equally longitudinally spaced apart openings 12a–12f. As shown in FIG. 2, the number of these openings and consequently the length of label 10 may be increased or decreased as conditions require to provide the number of label data bits needed. Thus openings 12a, 12b and 12c represent data bits $D_1$, $D_2$ and $D_3$ respectively; openings 12d represents data bit $D_{n-1}$; openings 12e represents data bit $D_n$; and openings 12f represents a parity bit P for checking the code of opening 12a–12e.

To indicate the order of significance of the code data of opening 12a–12f the track 12 also has front data bits $B_1$, $B_2$. For control purposes the track 12 also has reset bits $R_1$ and $R_2$ adjacent the forward and rearward edges of the label. The bits $F_1$, $R_1$ and $F_2$ are defined by a notch 12g having a width equal to that of three contiguous openings. The bits $R_2$, $B_1$ and $B_2$ are defined by an opening 12h and two adjacent opaque segments of label material 16 each equal in width to an opening.

Track 14 contains a pattern of openings which are identical to the corresponding tracks 14 of all the other labels used in the system and provide indicia for determining movement of the label 10 for use in controlling reader operation in a manner to be described. Track 14 contains a plurality of identical openings 14a-14i separated from each other by an intervening segment of label material having a width lengthwise of label 10 equal to the corresponding width of the opening. The openings 14a-14i are positioned relative to track 12 so that they lie between adjacent indicia in track 12 providing the front, reset, code data, and back bits.

Although the openings in tracks 12 and 14 are readable as a logical "1", they could be characterized by the absence of openings readable as a logical "0". Similarly, although the reset and front bits are readable as a logical "1" they could be readable as a logical "0". Although the back bits are readable as a logical "0" they could as well be readable as a logical "1". It is merely necessary that the front and back bits be of known and opposite values so that the order of significance of the code data stored in the register 34 can be determined.

The sensor array 22 has three photoelectric sensors 22A, 22B and 22C, each emitting a beam of light which is not blocked by the label 10 is reflected by reflective target 26 back to only the sensor from which it was emitted. Sensors 22A-22C, which may comprise LED scanners marketed by Banner Engineering Corporation of Minneapolis, Minnesota, are positioned in a generally L-shaped configuration with sensor 22C being disposed above sensor 22B and sensor 22A being positioned immediately upstream of sensor 22B with reference to the forward label direction 24. As best seen in FIG. 2, the sensing element or opening of sensor 22C is disposed at about the centerline of track 12 so as to be responsive to readable indicia contained therein, while the sensor opening of sensors 22A, 22B are disposed at about the centerline of track 14 so as to be responsive to indicia contained therein. With reference to the longitudinal dimension of label 10, sensor 22A is positioned with respect to sensor 22B such that the sensor element of sensor 22B is disposed at about the mid-point of an opening in track 14 when sensor 22A is aligned with an adjacent opening edge. Stated differently, and considering track 14 as an alternating series of open and closed indicia zones, sensors 22A, 22B are preferably positioned so as to be substantially 90° out of phase.

In accordance with this invention the position of the sensor array 22 and target 26 relative to the path of travel of the label 10 can be interchanged or reversed so that they are in a mirror image of the position shown in FIG. 1. Even though in the mirror image position the realtionship of sensor of 22A to sensors 22B and 22C is reversed, the control and register circuitry 32 and 34 operates successfully in reading the label.

As shown in FIG. 1, sensors 22A-22C are connected to associated buffer amplifiers 30 so as to provide corresponding digital signals at the output of amplifiers 30 representative of reflective and non-reflective modes of operation. Operation of sensors 22A, 22B, 22C in a reflective mode characterized by transmission of a corresponding light beam to reflector 26 and back to the sensor is defined as yielding a corresponding signal A, B or C. Conversely, operation of a sensor in a non-reflective mode, normally due to the presence of label material in the beam path, yields a corresponding signal $\overline{A}$, $\overline{B}$ or $\overline{C}$.

The outputs of amplifiers 30 are fed to a label direction and control circuit 32. The C output of amplifiers 30 is also fed to the data input of a label code register 34 which receives a control input from label direction and read control circuit 32. Register 34 provides at its output a representation in binary coded decimal, for example, of the label code read from label 10.

In the particular working embodiment of the invention described in detail herein, label direction and read control circuit 32 and label code register 34 are embodied in a programmed microprocessor. Preferably, in accordance with such working embodiment, the microprocessor comprises a Z80 eight-bit microprocessor marketed by Zilog, Inc. of Cupertino, CA. A complete listing of the software program in Z80 assembly language by means of which the microprocessor functions is attached hereto and made a part hereof as Appendix I. The first and second pages of Appendix I comprise a table of instruction line numbers grouped by function as referenced in the following text. Program lines not so referenced relate to functions performed by the microprocessor of the working embodiment which are essentially unrelated to the invention herein claimed, such as communication with a remote central processing unit.

FIGS. 3-9 are schematic drawings illustrating operation of the label reading apparatus in accordance with the invention including the programmed microprocessor hereinabove described. FIGS. 3-7 include fragmentary and essentially schematic illustrations of label conditions or positions read by the apparatus in accordance with the invention, and a schematic diagram embodying conventional logic symbols illustrating the manner in which such conditions are sensed and read. It will be appreciated that the logic drawings of FIGS. 3-7 are illustrative in nature for assisting in visualization and description of the functional operation of the programmed microprocessor, particularly the label direction and read control circuitry 32 in FIG. 1.

In each of the FIGS. 3-7, the so-called positive logic convention is utilized, which is to say that a signal input such as A will be equal to a logical "1" upon occurrence of a specified condition, while the inverse thereof denominated $\overline{A}$ will be equal to a logical "1" in the absence of such condition, i.e. when A equals a logical "0". COSA is a signal generated within control circuit 32 representing a change of state or edge detected by sensor 22A. COSA is equal to a logical "1" when the output of sensor 22A changes from a logical "1" to a logical "0" indicating transition out of a label opening, or from a logical "0" to a logical "1" indicating transition into a label opening. CDIR and $\overline{CDIR}$ are signals generated within control circuit 32 indicating direction of motion of label 10 at the beginning or start of a label read cycle. CDIR equals logical "1" when the label is travelling in the forward direction 24 in FIGS. 1 and 2. Conversely, $\overline{CDIR}$ is equal to a logical "1" when the label is detected as travelling in the reverse direction (40 in FIGS. 3-7) at the beginning of a read cycle. The signal S generated within control circuit 32 indicates a label read cycle and is at a logical "1" during the read cycle. The various signals so defined and illustrated in FIGS. 3-7 are used identically in Appendix I. In the following description relative to FIGS. 3-7, parenthetic reference to a control or sensor signal, such as (S) or $(\overline{A})$, indicates that the state of the signal so referenced is a logical "1".

To facilitate description of the entire operation of apparatus 20, its operation when the label 10 moves continuously without interruption by the sensor array 22 in only the forward direction 24 will be described first. Initially the apparatus is idle or not in a read operation ($\overline{S}$), and when the label 10 has moved forward so that sensor 22B is adjacent on open region (B), transition of sensor 22A over an edge of the label (COSA) initiates the start of a read operation. As shown in the upper left-hand illustration of FIG. 3 when the label has traveled in the forward direction 24 so that the transition detected by sensor 22A is from reflective to non-reflective modes of operation ($\overline{A}$), a read operation in the forward direction is initiated by setting S and $\overline{CDIR}$ each equal to "1". This initiation of a read operation in the forward direction is performed by the instructions designated in Group A of Appendix I.

Figures 4, 5:
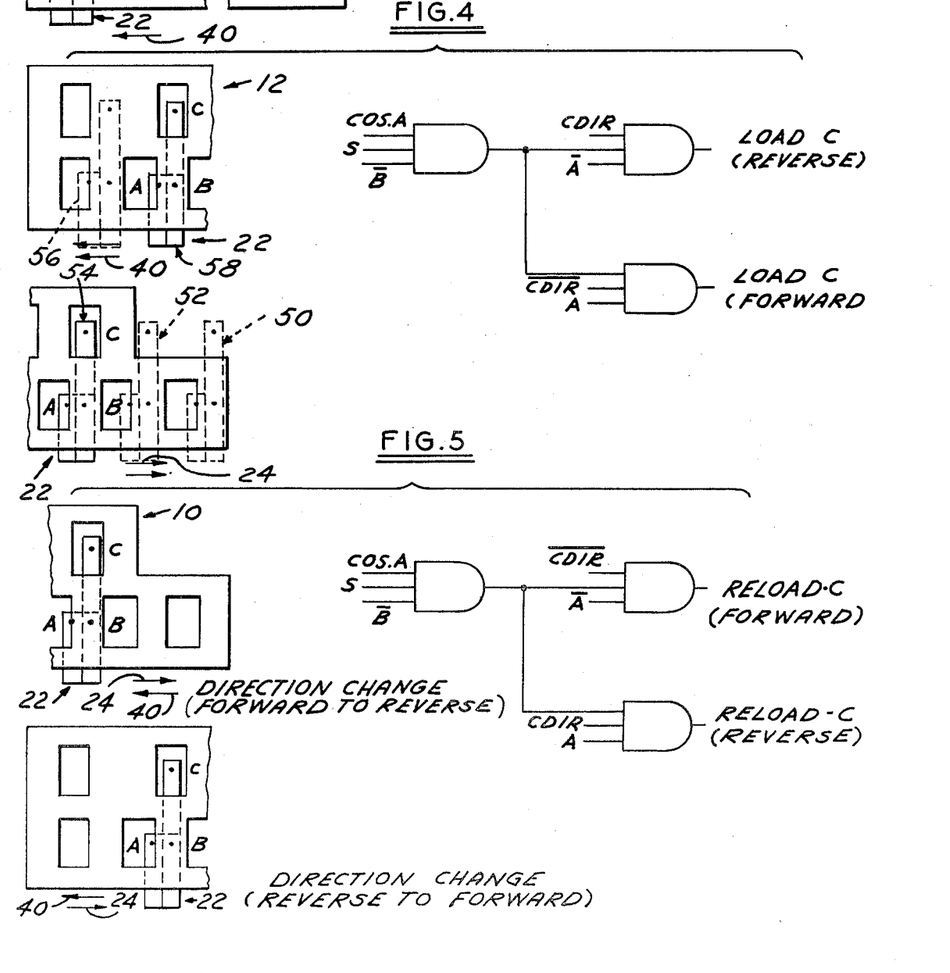

When the label has moved in the forward direction so that the sensor array 22 is in the position shown in phantom at 50 in the lower left-hand illustration of FIG. 4, sensor 22B detects a non-reflective condition ($\overline{B}$) and the apparatus 20 is responsive to transition (COSA) of sensor 22A from a non-reflective to a reflective mode (A) to load the front bit $F_1$ into code register 34 as a logical "1", by the logic shown in the right-hand of FIG. 4. This operation is performed by the instructions designated as Group B of Appendix I. As the label continues to travel in the forward direction, when the sensor array 22 is in the position shown in FIG. 2 an end of read initiation signal will be produced by the control circuitry illustrated in the right-hand portion of FIG. 6. More specifically when S, B, C and $\overline{CDIR}$ each equal to a logical "1" the transition from the reflective to non-reflective mode (COSA) of sensor 22A and the resulting signal ($\overline{A}$) produces an end of read indication which resets the read cycle to the idle condition. This reset condition causes the logic circuitry to determine the number of bits in the register 34 and if only one bit is found therein to produce a second forward initiation signal by setting S and $\overline{CDIR}$ both equal to "1". This is referred to as a "false start" situation.

This second occurrence of the forward read initiation signal causes the label code register pointer to be reset to the beginning of the label code register 34 thereby effectively cancelling the previously recorded front bit $F_1$. This operation of resetting the register pointer will only occur if only one data bit is stored in the register 34 and is accomplished by the instructions designated in Group D of Appendix I. The read cycle remains in effect (S) so that the succeeding front bit, data bits and a back bit will be recorded in the register. This cancelling of the previously recorded front bit $F_1$ provides sufficient flexibility in the control logic circuitry to enable reading of the label in both the forward and reverse directions when the array of sensors is mounted on either side of the path of travel of the label.

As the label continues to move in the forward direction [with S=1], when the array of sensors is in the position shown in phantom at 52 in the lower left-hand illustration of FIG. 4, sensor 22B is again detecting a non-reflective condition ($\overline{B}$) and apparatus 20 is responsive to the transition (COSA) of sensor 22A from a non-reflective to a reflective mode (A) to load the front data bit $F_2$ as a logical "1" into the first position in the label code register 34. This operation is performed by the instructions designated in Group B of Appendix I.

In the same manner on continuing forward movement of the label to successive positions of the sensor array 22 exampified at 54 in the lower left-hand illustration of FIG. 4, the data bits $D_1 \ldots D_n$, parity bit P, and back bit $B_2$ of openings 12a-12f and segment 16 are loaded into the label code register 34 by the logic circuitry of FIG. 4 in the same order in which they are read as the pointer of the register is serially incremented by the control logic. Photo sensor 22C is in a non-reflective mode ($\overline{C}$) when back bit $B_2$ is read and hence it is entered into the register as a logical "0". Upon completion of each data reading operation (FIG. 4) register 34 is checked for overflow. If the register does overflow, an error is indicated and the register is cleared.

Figure 6:
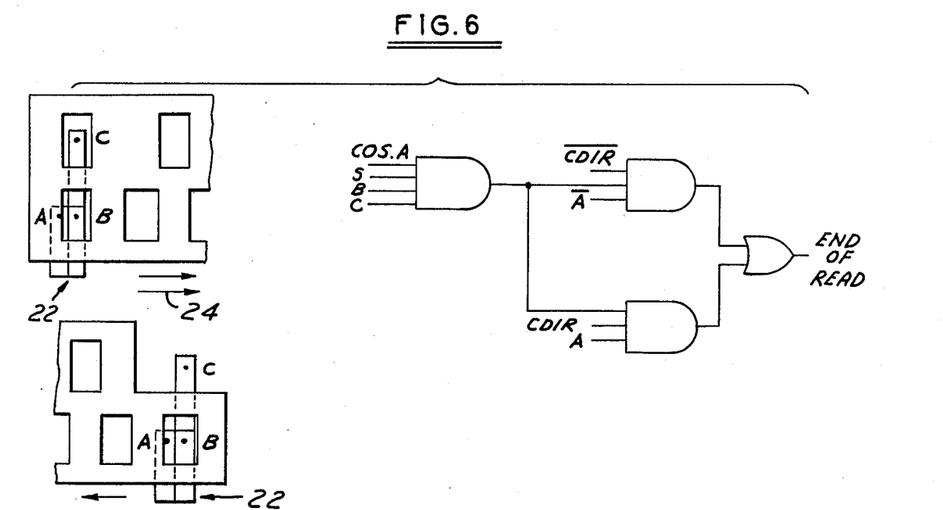

As the label continues to move in the forward direction when the array of sensors is in the position shown in the upper left-hand illustration of FIG. 6, the apparatus senses an end of read operation and terminates the reading operation. More specifically, when the label is travelling in the forward direction ($\overline{CDIR}$) during a read operation (S), and sensors 22B and 22C are both in the reflective mode (C), (B), the transition of the output of sensor 22A (COSA) coupled with the non-reflective mode ($\overline{A}$) of sensor 22A is interpreted as an end of read operation in the forward direction. The label code is presented at the output of register 34 and the read operation signal S is reset [such that $\overline{S}=1$] to indicate a reader idle condition.

At the same time in the working embodiment of the invention checks are made for the correct parity or multiples of four data bits [for conversion into BCD]. The first and last data bits in the register [$F_2$, $B_2$] are also scanned to determine the order of significance of the label code. This check would indicate that in the forward read operation just described the first bit in the register was a front bit or logical "1" and the last bit was a back bit or logical "0" and hence the data was read and stored in the register 34 in the order of $F_2$, $D_1 \ldots D_n$, P, $B_2$. The label code is then converted in the desired order of significance of the data bits into ASCII and any errors are reported. These operations are performed by the instructions specified in Group D of Appendix I. Initiation of a subsequent read operation may then begin per FIG. 3.

Operation of the apparatus when the label 10 moves continuously by the sensor array 22 in the reverse direction 40 without interruption will now be described. When label 10 is travelling in reverse direction 40, a read operation is initiated when the sensor array is in the position shown in the lower left-hand illustration of FIG. 3 by the transition (COSA) of sensor 22A from non-reflective to reflective modes (A) which sets S and CDIR each equal to "1". Register 34 is cleared upon initiation of this read operation. This initiation of the read operation is performed by the instructions designated in Group A of Appendix I. In the reverse direction, the back bit $B_1$ is not read into the storage register 34 because the read operation has not been initiated when the first transition of sensor 22A from the reflective to the non-reflective mode occurs.

As the label continues to move in the reverse direction, when the sensor array 22 in the position shown in phantom at 56 in the upper left-hand illustration of FIG. 4, the back bits $B_2$ is read into the register as a logical "0". More specifically, with S and CDIR each equal to "1", and the sensor 22B in the non-reflective mode ($\overline{B}$), upon transition (COSA) of the sensor 22A from the reflective to the non-reflective mode ($\overline{A}$) the back bit $B_2$ is read into the first position of the storage register as a logical "0". Similarly as the label 10 continues to move in the reverse direction the sensor array 22 assumes a consecutive series of positions the first of which is shown at 58 in the upper left-hand illustration of FIG. 4 to sequentially read into subsequent positions of the storage register 34 in the following order the parity bit P, label code data bits $D_n \ldots D_1$, and the front bit $F_2$. These read operations are performed by the instructions designated in Group B of Appendix 1.

As the label 10 continues to move in the reverse direction, when the sensor array 22 is in the position shown in the lower right-hand illustration in FIG. 6, the apparatus detects an end of read operation. More specifically, with label 10 travelling in the reverse direction (CDIR) during a read operation (S), and sensors 22B and 22C both in reflective modes of operation (B), (C), transition of the output (COSA) of sensor 22A to a reflective mode (A) indicates completion of and terminates the read operation in the reverse direction by setting $\overline{S}$ equal to "1". This termination of the read operation is carried out by the instructions designated in Group D of Appendix I. Continuing movement of the label 10 in the reverse direction 40 does not read into the register, the front bit $F_1$ because the reading operation has previously been completed $(\overline{S})$ so that the reader is in idle condition.

Upon the completion of the reaading operation, as previously described, checks are made for correct parity and order of significance, the label code is converted into ASCII, and any errors are reported. The first and last bits of data in the storage register are checked to determine the sequence in which the data was read and stored in the register so that it can be read out in the desired order of significance of the data. When the label is read in the reverse direction as described, this check indicates the first bit in the register code is a logical "0" and the last bit in the register is a logical "1", and hence, the data was read and is stored in the register in the order of $B_2$, P, $D_n \ldots D_1$, $F_2$. These operations are performed by the instructions designated in Group D of Appendix I. Initiation of a subsequent read operation may then begin per FIG. 3.

Figure 7:
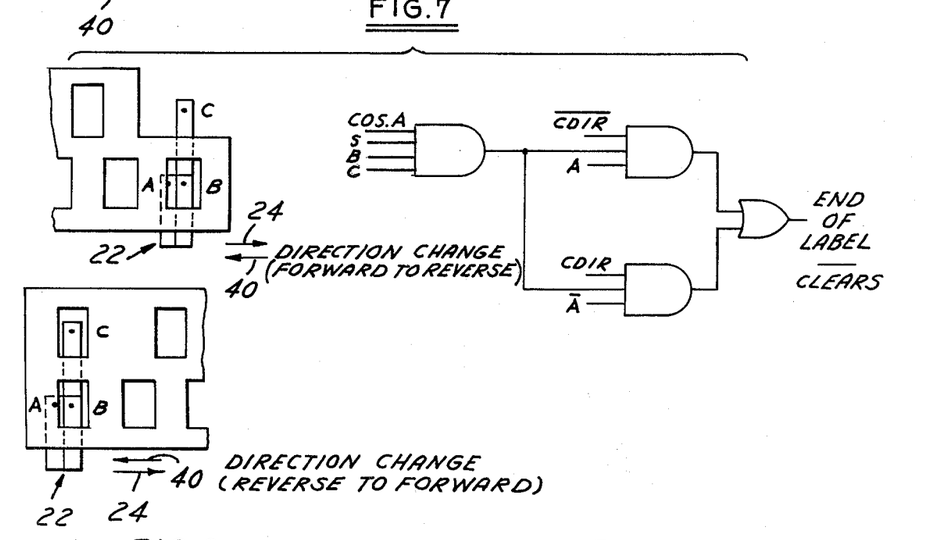

In accordance with another feature of this invention, the reader is adapted to detect and abort a read operation where the label changed direction during the course of travel so that only one end passes the sensor array 22 twice in the manner illustrated in FIG. 7. This operation corresponds to instruction Group E in Appendix I. That is, detection of a reflective mode of operation at all of the sensors such that A, B and C all equal 1, coupled with a change of state at sensor 22A (COSA) and an indication that the label has begun travel in the forward direction ($\overline{CDIR}$) indicates that the label had changed direction from forward to reverse during the read operation and that the forward end of the label is again passing the sensor array. The read operation is aborted and the reader is reset to idle $(\overline{S})$. Similarly, an end of label following a direction change from reverse to forward per the lower left-hand illustration in FIG. 7 is indicated when both of sensors 22B, 22C are in a reflective mode (B and C), and sensor 22A is in a non-reflective mode ($\overline{A}$) following a change of state at sensor 22A (COSA) and an indication that the label had begun travelling past the sensor array in the reverse direction (CDIR).

In accordance with another feature of this invention, FIG. 5 illustrates detection of a reversal or change in direction of travel of a label through the reader apparatus during a read operation in either the forward or reverse direction, and operation upon detection of such change of direction. This operation is performed by the instructions designated in Group C of Appendix I. Assuming that label 10 was first travelling in the forward direction 24 as in the upper left-hand illustration in FIG. 5 (S and $\overline{CDIR}$), continued forward travel as in FIG. 4 previously discussed would mean that, following any change of state of sensor 22A (COSA) with sensor 22B aligned with a non-reflective zone ($\overline{B}$), sensor 22A would be adjacent an opening and therefore in a reflective mode of operation. However, if sensor 22B is in a non-reflective mode ($\overline{B}$) and the output of sensor 22A changes state (COSA) to a non-reflective mode ($\overline{A}$) the label has changed direction of travel as compared with the initial direction of travel indicated per FIG. 3. Upon occurrence of each such a condition, the label code register pointer is decremented to enable subsequent reloading of data over the corresponding data signals previously sensed and stored when the label was travelling in its initial direction.

More specifically, with the label travelling in the forward direction 24, the first bit of the label code is read by sensor 22C and stored in memory at the label position as shown at 54 in the lower left-hand illustration of FIG. 4. If the label then immediately changes direction from the lower left-hand illustration in FIG. 4 to the upper left-hand illustration of FIG. 5, transition (COSA) of sensor 22A from the reflective to non-reflective mode ($\overline{A}$) causes the register load pointer to be decremented to the same first location in register memory. If several bits have been read and stored in a forward read operation and the label then changes direction, such that the data register pointer is decremented past the beginning of the bits in the register, the read operation is aborted and the apparatus is reset to idle $(\overline{S})$.

Similarly, if the label changes direction from reverse to forward as in the lower left-hand illustration of FIG. 5, such that sensor 22A is aligned with a reflective portion of the label (A), the data register pointer is decremented for each bit passed in the changed direction. When the label again changes direction and resumes travel in the original direction, data originally loaded into the register 34 is replaced by new data under control of the data register pointer. Thus it will be apparent that label 10 could change direction several times during a read operation without affecting validity of the label code actually read provided that the read operation is eventually completed per FIG. 6 and not aborted per FIG. 7.

In accordance with a further feature of this invention labels can also be read when the sensor array 22 is effectively disposed at the location of reflector 26 in FIG. 1 and the reflector is effectively disposed at the location of sensor array 22. The mirror image situation may also be visualized conceptually in FIGS. 3–7 as one wherein sensor 22A is disposed to the right of sensor 22B rather than to the left as shown. Thus, label 10 may be travelling in a "forward" direction 24 in FIG. 3, but the forward edge of the label which includes notch 12g encounters sensors 22B and 22C prior to sensor 22A.

Figure 3:
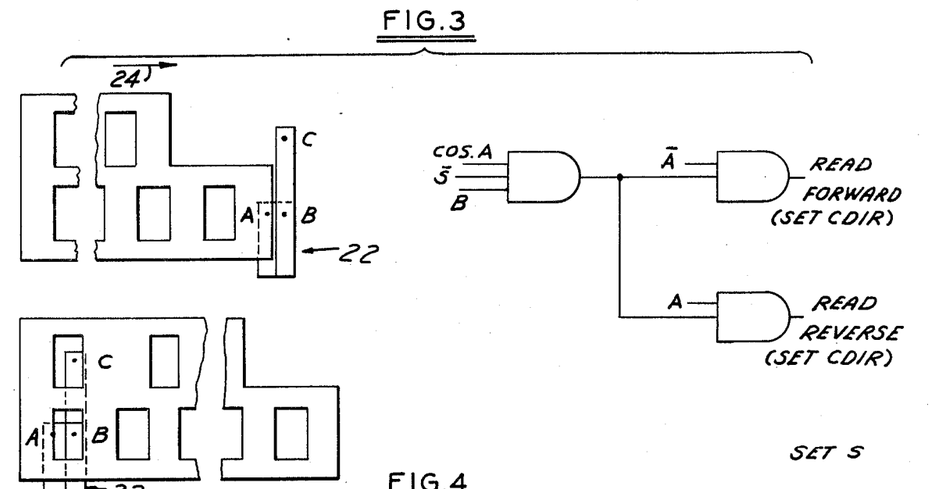
FIGS. 3-9 are schematic diagrams useful in describing and understanding the operation of the invention illustrated in FIGS. 1 and 2.
Figure 8:
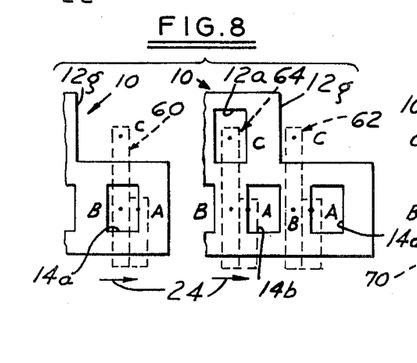

In this mirror image situation with label 10 moving continuously in the forward direction, when the sensor array is in the position shown in phantom at 60 in the lefthand illustration of FIG. 8 a read operation will be initiated by the logic circuitry of FIG. 3 labeled "read reverse". More specifically, with sensor 22B in the reflective mode (B) and transition (COSA) of sensor 22A the non-reflective to reflective mode (A), CDIR and S will each be set equal to a logical "1" to initiate a read cycle.

As the label continues to move in the forward direction when the array of mirror image sensors is in the position shown in phantom at 62 in the right-hand illustration of FIG. 8, the front bit $F_2$ will be read into the register 34 by the logic circuitry of FIG. 4 labled "load reverse". As the label continues to move in the forward direction the array of mirror image sensors will sequentially assume positions exemplified in phantom at 64 in the right-hand illustration of FIG. 8, which will cause the logic circuitry of FIG. 4 labled "load reverse" to read into the subsequent positions of register 34 in the following sequence the data bits $D_1 \ldots D_n$, P, and $B_2$.

Thereafter, as the label continues to move in the forward direction the mirror image sensors will all become conductive (A), (B) and (C) when sensors 22A and 22B are in line with hole 14$i$ and sensor 22C is simultaneously in line with hole 12$a$. This will cause the logic circuitry of FIG. 6 to end the read operation and reset the apparatus to the idle condition ($\overline{S}$). Upon completion of the read operation checks are made for parity and order of significance, the data is converted into ASCII, and any errors are reported. Initiation of a subsequent read operation may then begin per FIG. 3.

Figure 9:
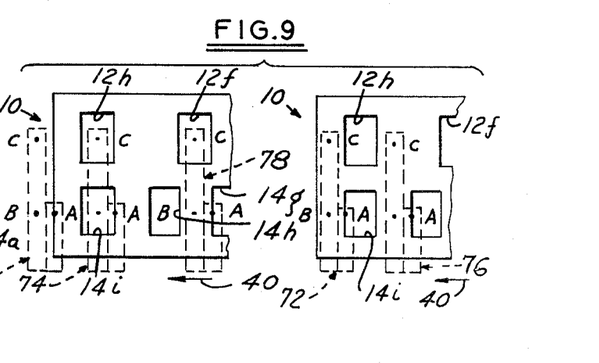

With the label continuously moving in the reverse direction 40 past an array of mirror image sensors the read operation is initiated when the array is in the position shown in phantom at 70 in the left-hand illustration of FIG. 9 by the logic circuitry of FIG. 3 labled "read forward". As the label 10 continues to move in the reverse direction when the mirror image sensors are in the position shown in phantom at 72 in the right-hand illustration of FIG. 9, the back bit $B_1$ is read into the first position of the register 34 by the logic circuitry of FIG. 4 labeled "load forward".

As the label 10 continues to move in the reverse direction 40, when the mirror image sensors are in the position shown at 74 in the left-hand illustration of FIG. 9, as previously described, the logic circuitry of FIG. 6 detects a reset condition, checks to determine the number of bits in the register, and upon finding only one bit therein identifies this situation as a "false start" and resets the pointer of the register to the first position and S equal to "1" to continue the read operation. Thereafter, as label 40 continues to move in the reverse direction, when the mirror image sensors are in the position shown in phantom at 76 in the right-hand illustration of FIG. 9 the forward logic circuitry of FIG. 4 loads into the first position of the register the back bit $B_2$. As the label 10 continues to move in the reverse direction the mirror image sensors assume a series of positions exemplified in phantom at 78 in the left-hand illustration of FIG. 9, which causes the "load forward" logic circuitry of FIG. 4 to sequentially read into subsequent positions of the register 34 the bits P, $D_n \ldots D_1$ and $F_2$.

As the label continues to move in the reverse direction, when the mirror image sensors 22A and 22B are adjacent the opening 14$a$ and hence conductive (A), (B) and sensor 22A changes (COSA) from the reflective to non-reflective mode ($\overline{A}$) as it passes the edge of opening 14$a$ adjacent the end of the label, the logic circuitry of FIG. 6 terminates the reading operation and resets the apparatus to the read idle condition. As previously explained, the data in register 34 is then checked for parity and order of significance, converted into ASCII, and any errors are reported. Initiation of the subsequent read operation may then begin per FIG. 3.

Thus, in accordance with another feature of this invention the label code may also be read when the array of sensors is disposed on either side of the path of travel of the label regardless of the direction in which the label moves past the sensors.

It will be apparent that the apparatus 20 loads into the register 34 the front bit $F_2$, label code data bits $D_1 \ldots D_n$, parity bit P, and back bit $B_2$ in the order in which they are read. Since the values of the front and back bits are always known, opposite, and unvarying, the order of significance of the code label data in the register 34 may always be determined and the data read out in the desired order of significance by observing the values of the first and last bits recorded in the register. Indeed, a label can be read and the correct order of significance of the data determined even if the label is turned end for end from the position shown in FIG. 1.

Although the invention has been described in connection with a presently preferred embodiment thereof, several alternatives and modifications are envisioned. For example, it will be apparent that the invention is not limited to reading a label code consisting of five data bits (zones 12$a$–12$e$) and a parity bit (zone 12$f$), but that the number of label code data bits and the length of label 10 may be increased or decreased as conditions require. Furthermore, although the invention has been described in detail in connection with a presently preferred working embodiment thereof which operates under control of a programmed microprocessor, it will be apparent, particularly in view of the discussion relative to FIGS. 3–7, that label direction and control circuit 32 and label code register 34 could as readily be provided in the form of conventional discrete hardware elements and/or integrated circuits without departing from the teachings of the invention.

It will also be appreciated that the invention is limited neither to provision of a single data track 12 nor to coding in serial BCD. To the contrary, multiple data tracks may be provided one above the other, together with multiple sensors 22C one above the other and corresponding multiple data storage registers.

In its broadest aspects, the invention is not limited to reflective-type photoelectric sensors, but may be made responsive to translucent and opaque portions of a label, for example, by disposition of optical source and detection elements on opposite sides of the path of label travel. Alternatively, the indicia may take the form of magnetic zones on a substrate of non-magnetic material, in which event the sensors may comprise Hall effect elements, reed switches or electromagnetic sensor coils. The indicia may also take the form of raised embossments or the like on the label surface, in which case the sensors may comprise suitable switches activated by such embossments.

APPENDIX I

Instruction Groups Specifically Referenced in Disclosure

| Group | Program Lines | Function Performed |
|---|---|---|
| A | 191–213 | Read Photoeyes & Compute Dispatch Index |
| | 215–251 | Dispatch - Specifically Lines 226 & 242 for forward initialization and lines 222 & 238 for reverse initialization. |
| | 259–262 and 266–270 | Forward Initialization |

APPENDIX I-continued

Instruction Groups Specifically Referenced in Disclosure

| Group | Program Lines | Function Performed |
|---|---|---|
| | 263–265 and 259–262 and 266–270 | Reverse Initialization |
| B | 191–213 | Read Photoeyes & Compute Dispatch Index |
| | 215–251 | Dispatch - Specifically Lines 228 & 248 |
| | 271–282 | Increment Data Buffer Pointer and Store Data |
| C | 191–213 | Read Photoeyes & Compute Dispatch Index |
| | 215–251 | Dispatch - Specifically Lines 232 & 244 |
| | 283–294 and 268–270 | Decrement Data Buffer Pointer to Preceding Bit |
| D | 191–213 | Read Photoeyes & Compute Dispatch Index |
| | 215–251 | Dispatch - Specifically Lines 234 & 246 |
| | 296–337 | Data Direction Detection & Error Checking |
| | 340–384 | Conversion to ASCII for transmission, error checking & output to translated label buffer |
| E | 191–213 | Read Photoeyes & Compute Dispatch Index |
| | 215–251 | Dispatch - Specifically Lines 230 & 250 |
| | 254–258 | Reset to STATE=0 if PHOTOEYE C is at a '1' state |
| F | 301–304 | Test for only one bit recorded in label code register |
| | 266–270 | Reset label code register pointer on condition of only a single data bit recorded |

The invention claimed is:

1. Apparatus for reading a label or the like carrying a code readable in the form of binary indicia comprising means for defining a path to receive a label in an orientation such that said indicia are disposed in at least one track extending in the direction of label travel in said path, first and second sensor means disposed in spaced positions adjacent to said path respectively corresponding to positions of said tracks on a label traveling in said path, first means for receiving input data signals from said first sensor means as a function of indicia in a first portion of said tracks passing adjacent to said first sensor means, second means responsive to indicia in a second portion of said tracks for loading data signals from said first sensor means into said first means, third means responsive to said first and second sensor means for loading data control signals into said first means as a function of the direction and orientation of travel of a label traveling in said path adjacent to said sensor means, and fourth means responsive to said data control signals for outputting said data signals in a predetermined order of significance independently of the direction and orientation of travel of the label past said sensor means.

2. The apparatus set forth in claim 1 further comprising fifth means responsive to said second sensor means for detecting a reversal of direction of travel of a label traveling in said path, said second means including means responsive to said fifth means and to said indicia in said second of said track portions for inhibiting loading of indicia read by said first sensor means as new data into said first means, such that said code is stored in said first means independently of changes of direction of travel of a label in said path.

3. The apparatus set forth in claim 2 wherein said second sensor means comprises first and second sensors spaced from each other in the direction of travel of a label in said path, said first and second sensors having respective outputs as a function of indicia in said second track portion adjacent the corresponding said first and second sensor.

4. The apparatus set forth in claim 3 for reading indicia at predefined zones in said first and second track portions, zones in at least said second track portion having a predetermined dimension in said direction of travel and being comprised of indicia of alternating opposite polarity, wherein said first and second sensors are spaced from each other along said direction of travel so as to read indicia in said second track portion in quadrature phase with respect to each other.

5. The apparatus set forth in claim 4 wherein said sensor means including said first and second sensors comprise photoelectric sensors.

6. Apparatus for reading a label or the like carrying a code readable in the form of binary signals characterized by presence or absence of indicia at predefined zones, said apparatus comprising means for defining a path to receive a label in an orientation such that said zones are disposed in first and second track portions extending in the direction of label travel in said path, with said indicia in said second track portion being of alternating opposite polarity in successive ones of said zones, first sensor means disposed adjacent to said path at a position to be responsive to indicia in said first track portion, second and third sensor means disposed adjacent to said path and spaced from each other in said direction of travel at positions to be responsive in quadrature phase with respect to each other to said indicia of alternating polarity in said second track portion, each of said first, second and third sensor means having a corresponding sensor output which varies as a function of presence or absence of indicia adjacent to the corresponding sensor means, means including data storage means for receiving said label code in the form of binary data signals from the output of said first sensor means as a function of indicia in said first tracck portion, means responsive to data signals in said storage means for providing an output signal indicative of said label code, and control means responsive to the outputs of said second and third sensor means for selectively controlling said means responsive to said data signals such that said output signal is indicative of said label code stored in said data storage means in a predetermined order of significance of said data signals independently of direction of travel of a label in said path.

7. The apparatus set forth in claim 6 wherein said outputs of said sensor means comprise logic signals at one of two logic states as a function of presence or absence of said indicia adjacent to the corresponding said sensor means, and wherein said control means includes means conjointly responsive to a change of state of one of said outputs of said second and third sensor means and the state of the other of said outputs of said second and third sensor means for controlling entry of said data signals.

8. The apparatus set forth in claim 6 for reading a label in which said indicia is in the form of apertures in a flat label element, wherein said sensor means comprise photoelectric sensor means, and wherein said means for defining said path includes reflective means disposed with respect to said sensor means such that label travel in a path between said reflective means and said sensor means.

9. Apparatus for reading a label or the like carrying a code readable in the form of binary indicia comprising means for defining a path to receive a label in an orientation such that said indicia are disposed in one or more tracks in the direction of label travel in said path, sensor means disposed adjacent to said path at positions corresponding to said tracks for providing sensor output signals as a function of indicia in said tracks, means responsive to said sensor output signals for loading a label code comprising a series of digital data signals as a function of said indicia as a label travels in said path past said sensor means, means responsive to preselected ones of said data signals in said series for identifying the direction and orientation of label travel in said path, and means for outputting said label code in a predetermined order of significance independently of the direction and orientation of the label in said path.

10. In the combination of a label carrying a code readable in the form of a series of binary indicia and a label code reader including means responsive to passage of said label for providing an output signal as a function of said label code, the improvement wherein said label includes indicia at opposite ends of said series which are of predetermined digital level relative to the order of significance of the remainder of said indicia in said series, and wherein said reader includes means responsive to said indicia at opposite ends of said series for providing said output signal in a predetermined order of significance of said binary indicia independently of direction of travel and orientation of said label relative to said reader.

11. The apparatus set forth in claim 1 for reading a label in which said indicia is in the form of apertures in a flat label element, wherein said sensor means comprise photoelectric sensor means, and wherein said means for defining said path includes reflective means disposed with respect to said sensor means such that labels travel in a path between said reflective means and said sensor means.

12. The apparatus set forth in claim 3 for reading indicia at predefined zones in said first and second track portions, zons in at least said second track portion having a predetermined dimension in said direction of travel, wherein said first and second sensors are spaced from each other in said direction of travel so as to be responsive in quadrature phase with respect to each other to said indicia in said second track portion.

* * * * *